United States Patent
Pieper

(10) Patent No.: US 6,308,349 B2
(45) Date of Patent: Oct. 30, 2001

(54) SANITARY TUB

(75) Inventor: Fritz Pieper, Delmenhorst (DE)

(73) Assignee: Franz Kaldewei GmbH & Co. KG, Ahlen (DE)

( * ) Notice: Subject to any disclaimer, the term of this patent is extended or adjusted under 35 U.S.C. 154(b) by 0 days.

(21) Appl. No.: 09/725,709

(22) Filed: Nov. 29, 2000

(30) Foreign Application Priority Data

Dec. 1, 1999 (EP) .................................................. 99123852

(51) Int. Cl.[7] .............................. A47K 3/02; B29C 63/48
(52) U.S. Cl. .................................................. 4/538; 4/584
(58) Field of Search .............................. 4/538, 584, 619; 427/410; 428/35.9, 34.1

(56) References Cited

U.S. PATENT DOCUMENTS

| | | | |
|---|---|---|---|
| 3,816,234 | * 6/1974 | Winfield | 4/538 |
| 3,826,629 | * 7/1974 | Pryor et al. | 4/538 |
| 5,494,718 | * 2/1996 | Adams et al. | 4/538 |
| 5,580,621 | * 12/1996 | Kuszaj et al. | 4/538 |

FOREIGN PATENT DOCUMENTS

| | | |
|---|---|---|
| 24 18 118 | 10/1975 | (DE) . |
| 44 31 716 | 2/1996 | (DE) . |
| 0 015 020 | 9/1980 | (EP) . |

* cited by examiner

Primary Examiner—Charles R. Eloshway
(74) Attorney, Agent, or Firm—Collard & Roe, P.C.

(57) ABSTRACT

The invention relates to a sanitary tub with an outer shell made of steel sheet, an inner shell made of plastic, and an intermediate layer connecting the two shells. A protective coating is applied to the outer shell to protect against corrosion. The outer shell is provided with a coating applied to both the inner and outer sides. This coating consists of a conversion layer produced by phosphatizing, and a lacquer forming on the outer side the abrasion and impact resistant protective coating. On the inner side of the shell an agent effectively imparts adhesion between the steel sheet and the intermediate layer without mechanical roughening.

14 Claims, 1 Drawing Sheet

SANITARY TUB

BACKGROUND OF THE INVENTION

1. Field of the Invention

The invention relates to a sanitary tub with an outer shell made of a steel sheet, an inner shell made of plastic, and an intermediate layer connecting the two shells. A protective coating is applied to the outer shell for protection against corrosion.

2. The Prior Art

Sanitary tubs are known from DE-C 44 31 716, in which the outer shell is pickled and basically enameled on the back side. Since the adhesion of the intermediate layer consisting of a polyurethane or a methacrylic compound is inadequate on an enameled surface, no enameling is provided on the inner surface of the steel sheet shell. This makes manufacturing of the tub more difficult because a commonly used immersion process cannot be applied for the enamel coating. The coating of enamel applied to the inner side has to be mechanically removed, for example by sandblasting, or at least have the surface roughened. According to another design described in DE-C 44 31 716, the outer shell, which is deep-drawn from steel sheet, is pickled and passivated before the acrylic shell is molded on the inner side and glued to the steel blank. In a last process step, the rust-preventing coating is applied to the outer shell of the composite tub. In this step, the ledge and the inner side of the composite tub, which is already manufactured, have to be covered by a costly process. Furthermore, there is the risk that the protection against corrosion may be incomplete along the ledge of the tub because of the required coverings.

SUMMARY OF THE INVENTION

An object of the present invention is to provide a sanitary tub having the structure described above, without damaging the corrosion protection on the outer shell and the connection between the outer and inner shells during production.

This object is accomplished by providing the outer shell with a coating both on the inner and outer sides that consists of a conversion layer produced by phosphatizing, and a lacquer. This coating forms an abrasive surface and an impact-resistant protective layer on the outer side. On the inner side of the shell. The coating provides an adhesive agent between the steel sheet and the intermediate layer that is effective without mechanical roughening. According to the invention, before the steel blank is joined with the plastic inner shell, it is provided both on the inner and outer sides with a coating that can be applied by economical application methods. The coating consists of a conversion layer that can be produced by iron or zinc phosphatizing, and a lacquer applied to the conversion layer. Since the entire steel blank is lacquered and no covering is required, it is possible to employ economical lacquering methods that are suitable for mass production. The lacquer can be applied by air atomizing, airless spraying, electrostatic spraying, by immersion methods, or by electro-immersion painting. The present invention uses an anti-corrosion coating agent protecting the steel sheet shell against corrosion as well as providing a good adhesion between the outer shell and the adjoining intermediate layer producing the connection between the plastic inner shell and the metallic outer shell. Therefore, the coating agent satisfies the different functions of the outer side of the steel blank and the inner surface of the steel blank.

The intermediate layer preferably consists of a polyurethane or a methacrylic compound. The conversion coating substantially contains iron phosphates with components of iron oxide, or zinc phosphates depending on the selected phosphatizing method.

In addition, the invention discloses the method of manufacturing the sanitary tub having an inner and outer shell. An intermediate layer is applied between the inner shell and the outer shell. A protective coating is then applied to an inner and outer side of the outer shell. The protective coating comprises a conversion layer produced by phosphatizing, and a lacquer forming an abrasion and impact resistant layer on the outer side, and an adhesive agent on the inner side between the outer shell and the intermediate layer without roughening.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figures 1, 2:
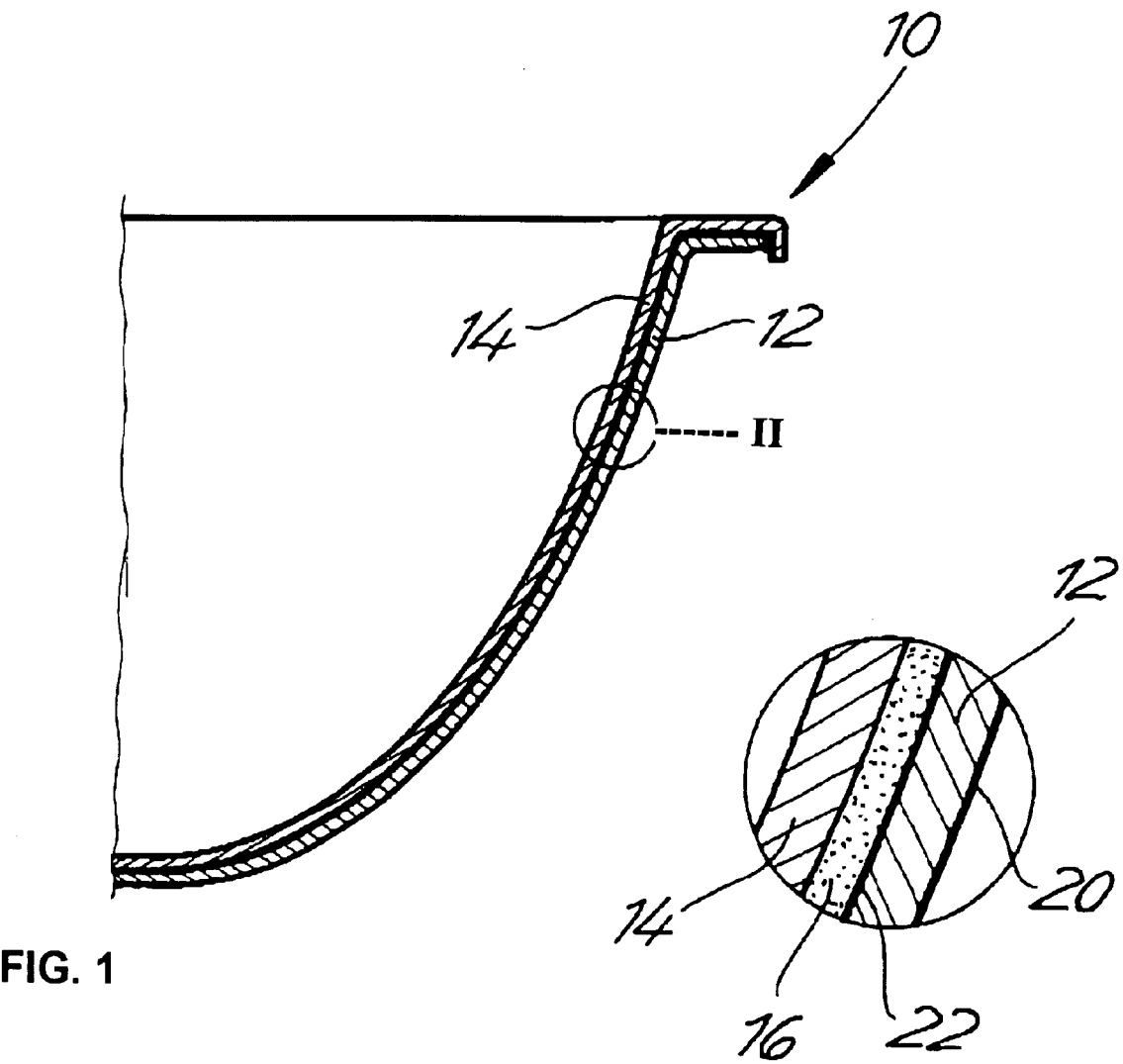
FIG. 1 shows the layers of the sanitary tub according to the invention.
FIG. 2 shows an exploded view of the layers shown in FIG. 1.

Referring now in detail to the drawings and, in particular, FIG. 1 shows a tub 10 having an outer shell 12, an inner shell 14 and an intermediate layer 16. FIG. 2 shows an outer shell comprising an outer side 20 and an inner side 22. A protective coating is applied to outer side 20 and inner side 22 of outer shell 12. The protective coating comprises a conversion layer produced by phosphatizing, and a lacquer forming an abrasion and impact resistant layer on outer side 20. An adhesive agent is formed on inner side 22 between outer shell 12 and intermediate layer 16 without roughening.

The lacquer according to the present invention is based on epoxy resin, particularly baking enamels. According to a preferred embodiment of the invention, a water-dilutable epoxy resin lacquer applied by electro-immersion painting is used. A thin film between 10 and 40 μm with a high solids content can be applied by electro-immersion lacquering. After rinsing off the film of lacquer with ultra-filtrated water, the film of lacquer receives its final hardness and strength at a baking temperature between 150 and 200° C. The coating with an epoxy resin lacquer is characterized by excellent adhesive strength, high hardness, as well as high resistance to abrasion. Furthermore, it has surprisingly favorable primer properties, and it effects a solid bond with the intermediate layer, which consists of a polyurethane or methacrylic compound. The result is a sanitary tub with a strong bond between the metallic outer shell and the plastic inner shell.

According to another embodiment of the invention, the coating applied to both the inner and outer sides of the metallic outer shell consists of a conversion layer produced by phosphatizing, and a polyurethane (PUR) lacquer. One-component and two-component PUR-lacquers can be employed. The PUR lacquer systems are characterized by high hardness, permanent elasticity and resistance to abrasion. In addition, the result is a surprisingly strong adhesion with the intermediate layer bonding the inner and outer shells.

Accordingly, while a few embodiments of the present invention have been shown and described, it is to be understood that many changes and modifications may be made thereunto without departing from the spirit and scope of the invention as defined in the appended claims.

What is claimed is:

1. A sanitary tub comprising:

an inner shell made of plastic;

an outer shell made of a steel sheet having an inner side and an outer side;

an intermediate layer disposed between the inner shell and the outer shell; and a protective coating applied to said inner and outer sides of said outer shell, said protective coating comprising a phosphatized conversion layer, and a lacquer, said protective coating forming an abrasion and impact resistant layer on said outer side, and an adhesive agent on said inner side between the outer shell and the intermediate layer, wherein said inner side does not require roughening.

2. The sanitary tub according to claim 1, wherein the intermediate layer is selected from the group consisting of polyurethane compounds and methacrylic compounds.

3. The sanitary tub according to claim 1, wherein said conversion layer comprises iron phosphates.

4. The sanitary tub according to claim 1, wherein said conversion layer comprises zinc phosphates.

5. The sanitary tub according to claim 1, wherein said lacquer is a baking enamel based on epoxy resin.

6. The sanitary tub according to claim 1, wherein said lacquer is a water-dilutable epoxy resin lacquer applied by electro-immersion painting.

7. The sanitary tub according to claim 1, wherein said lacquer is a polyurethane (PUR) lacquer.

8. A process for manufacturing a sanitary tub having an inner shell, an outer shell containing an inner and outer side, comprising the steps of:

placing an intermediate layer between the inner shell and the outer shell; and applying a protective coating to said inner and outer sides of the outer shell, said protective coating comprising a conversion layer produced by phosphatizing, and a lacquer, said protective coating forming an abrasion and impact resistant layer on said outer side, and an adhesive agent on said inner side between the outer shell and the intermediate layer, wherein said inner side does not require roughening.

9. The process according to claim 8, wherein said intermediate layer is selected from the group consisting of polyurethane compounds and methacrylic compounds.

10. The process according to claim 8, wherein said conversion layer comprises iron phosphates.

11. The process according to claim 8, wherein said conversion layer comprises zinc phosphates.

12. The process according to claim 8, wherein said lacquer is a baking enamel based on epoxy resin.

13. The process according to claim 8, wherein said lacquer is a water-dilutable epoxy resin lacquer applied by electro-immersion painting.

14. The process according to claim 8, wherein said lacquer is a polyurethane (PUR) lacquer.

* * * * *